(12) United States Patent
Delangis

(10) Patent No.: US 11,418,641 B2
(45) Date of Patent: Aug. 16, 2022

(54) DEVICES AND METHODS FOR MULTIPATH COMMUNICATIONS

(71) Applicant: Eric M. Delangis, Wylie, TX (US)

(72) Inventor: Eric M. Delangis, Wylie, TX (US)

(73) Assignee: Competitive Access Systems, Inc., Wylie, TX (US)

( * ) Notice: Subject to any disclaimer, the term of this patent is extended or adjusted under 35 U.S.C. 154(b) by 58 days.

(21) Appl. No.: 17/120,549

(22) Filed: Dec. 14, 2020

(65) Prior Publication Data

US 2021/0099572 A1 Apr. 1, 2021

Related U.S. Application Data

(63) Continuation of application No. 15/161,787, filed on May 23, 2016, now Pat. No. 10,868,908, which is a
(Continued)

(51) Int. Cl.

| | |
|---|---|
| H04M 3/00 | (2006.01) |
| H04L 12/54 | (2022.01) |
| H04L 45/24 | (2022.01) |
| H04W 88/16 | (2009.01) |
| H04L 45/00 | (2022.01) |
| H04L 47/70 | (2022.01) |
| H04L 61/5014 | (2022.01) |
| H04L 69/168 | (2022.01) |
| H04M 1/60 | (2006.01) |
| H04W 8/26 | (2009.01) |
| H04W 28/06 | (2009.01) |
| H04W 40/02 | (2009.01) |
| H04W 72/04 | (2009.01) |
| H04W 80/00 | (2009.01) |

(Continued)

(52) U.S. Cl.
CPC ........ *H04M 3/007* (2013.01); *H04L 12/5692* (2013.01); *H04L 45/24* (2013.01); *H04L 45/54* (2013.01); *H04L 47/821* (2013.01); *H04L 61/2015* (2013.01); *H04L 69/168* (2013.01); *H04M 1/6033* (2013.01); *H04W 88/16* (2013.01); *H04M 2203/052* (2013.01); *H04M 2203/60* (2013.01); *H04M 2250/06* (2013.01); *H04W 8/26* (2013.01); *H04W 28/06* (2013.01); *H04W 40/02* (2013.01); *H04W 72/04* (2013.01); *H04W 80/00* (2013.01); *H04W 84/12* (2013.01); *H04W 84/18* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 7,315,900 B1 * | 1/2008 | Ofelt | H04L 47/624 709/245 |
| 2002/0150099 A1 * | 10/2002 | Pung | H04L 47/70 370/432 |

* cited by examiner

*Primary Examiner* — Hong S Cho
(74) *Attorney, Agent, or Firm* — Clay McGurk; The Law Office of Clay McGurk

(57) ABSTRACT

Broadband communications devices and methods operate with at least two separate communication paths between the devices and the network, such as the Internet. The broadband devices and methods receive data concurrently over the communication paths or separately. The bandwidth is increased when the separate communication paths are combined. The broadband devices employ packetized data with Voice over Internet Protocol (VoIP) technologies combined with RF communications technologies.

3 Claims, 9 Drawing Sheets

Related U.S. Application Data continuation of application No. 14/512,414, filed on Oct. 11, 2014, now Pat. No. 9,350,649, which is a continuation of application No. 13/531,294, filed on Jun. 22, 2012, now Pat. No. 8,861,349, which is a continuation of application No. 12/581,852, filed on Oct. 19, 2009, now Pat. No. 8,228,801, which is a continuation of application No. 10/686,375, filed on Oct. 14, 2003, now Pat. No. 7,606,156.

(60) Provisional application No. 60/418,521, filed on Oct. 15, 2002.

(51) Int. Cl.
*H04W 84/12* (2009.01)
*H04W 84/18* (2009.01)

DEVICES AND METHODS FOR MULTIPATH COMMUNICATIONS

RELATED APPLICATIONS

This application is a continuation of U.S. patent application Ser. No. 15/161,787 filed May 23, 2016, soon to be patented as U.S. Pat. No. 10,868,908, which is a continuation of U.S. patent application Ser. No. 14/512,414 filed Oct. 11, 2014, now patented as U.S. Pat. No. 9,350,649, which is a continuation of U.S. patent application Ser. No. 13/531,294 filed Jun. 12, 2012, now patented as U.S. Pat. No. 8,861,349, which is a continuation of U.S. patent application Ser. No. 12/581,852 filed Oct. 19, 2009, now patented as U.S. Pat. No. 8,228,801, which is a continuation of U.S. patent application Ser. No. 10/686,375 filed Oct. 14, 2003, now patented as U.S. Pat. No. 7,606,156, which claims priority to U.S. Provisional Application Ser. No. 60/418,521, filed Oct. 15, 2002, all of which are incorporated by reference herein.

BACKGROUND OF INVENTION

The primary function of the RCG is to provide a platform for Competitive Local Exchange Companies (CLECs) to compete with the Local Exchange Companies (LECs) for residential voice and data services. The LECs have a strangle hold on the "last mile" of copper over which almost all residential customers receive their communications services. Today, most CLECs resell the existing services that are offered by the LECs. CLECs make their money by purchasing these services from the LECs at a discount and marking them up to the customer. Since these services are regulated and controlled by the Public Utilities Commission (PUC) the pricing for these services to the CLECs is set. The monthly CLEC discount is approximately $5 to $6 per line per month for basic rate services. This means, in practicality, that a CLEC can only charge an additional $5 or $6 to the residential customer for basic rate services otherwise they would be more expensive than the LEC, and no one would buy the services from them; telephone customers would simply stay with the LEC.

To be competitive then, CLECs try to sell additional services such as call waiting, caller ID, etc. where they have as much as a 50% margin. Some CLECs also bundle long distance services with their packages as additional incentive to get residential customers to buy local telephone service from them. Since long distance fees are as low as pennies per minute to the customer, there is little profit in long distance for the CLECs. As it is, the pricing structure is such that the LECs will stay in control of the residential market, and the CLECs are nothing more than a marketing arm of the LEC. This structure also keeps the CLECs at an equal competitive advantage, or disadvantage, with respect to each other. The only thing that one CLEC could do to gain more customers is to be a better marketier. Since the CLECs are unable to discount their services because their margins are too slim as it is, the net effect is that the consumer looses by not really getting competition in the residential markets, and prices are kept artificially high.

For the CLECs to be truly competitive in the local telecommunications markets, they must be able to do more than simply resell the LECs services. CLECs must be able to offer many more features or services than those that the LEC provides, and they must be able to do this at a lower cost, in order to attract new customers.

So, what new services can the CLECs offer? As things stand today there are none, with the exception of DSL or Cable services which require tremendous infrastructure costs on behalf of the CLEC. However, by deploying an RCG in a residence, CLECs can offer advanced new calling features and services over the existing POTS line. Their costs for the POTS line from the LEC remains the same, but they can now charge for high bandwidth data services as well as additional calling and messaging features that the LECs cannot offer. This is their competitive advantage.

Competition:

Many companies are currently trying to provide VoIP services to residential customers over high-speed or broadband backbones such as DSL and cable modems, over Internet connections via a computer. The high-speed services require expensive infrastructure enhancements to the local telephone companies' facilities and cable plants, as well as expensive modems at the customer's end. These services are also difficult to deploy and too complicated for the average user. Internet based VoIP services suffer from Internet delays caused by a lack of true Quality of Service (QOS) capabilities across the Internet. Existing VoIP services also require access to a computer and a technical knowledge to be able to make it work. Because of these problems, VoIP services are primarily targeted at the corporate market place where private IP networks that can carry VoIP services with a true guaranteed QOS exist, or can be controlled.

The only available alternatives for the residential user for high speed services are DSL and cable modems. DSL and Cable based communications reach only a small segment of the population, and growth has failed to live up to initial expectations. The recent collapse of the internet boom has led to the failure of many DSL service providers and has effectively eliminated DSL as a potential service for most POTS users for the immediate future.

SUMMARY OF THE INVENTION

The RCG combines the capabilities and features of IP routers, Class 5 circuit switches and wireless LANs in a small stand-alone external modem like device. Additional capabilities for a hands-free speakerphone device with a large touch display are also detailed. The RCG can employ a large display with sufficient resolution to provide a functional user interface to access all of the advanced features offered by the RCG, but also to be able to provide video telephone services.

The device is placed in a residence and connected to the primary POTS line coming from the LEC. Up to three standard telephones or FAX machines (or any combination) are typically connected into the RCG. It also has a Universal Serial Bus (USB) and/or a 10-100 Ethernet interface for connection to a computer or a Local Area Network (LAN). In addition, it has an 802.11b/g wireless interface for wireless home networking as well as broadband-to-the-home services.

The system is installed in a customer's home by simply plugging it into the existing incoming telephone line that provides POTS services from the LEC. One or more standard telephones are then plugged into its three line-output jacks. This is the simplest and most basic usage. In this implementation, the user only is interested in gaining additional telephone lines into the household. No computer connection is required in order to use the system. However, if data communications are desired, then there are three additional interfaces for computer connectivity. Typically either an Ethernet port, USB port or firewire (IEEE 1394) port is used to connect to a PC or LAN. The 802.11b/g interface is for wireless communications between the RCG and PCs, other RCGs as well as any other types of compatible wireless devices. A version of the RCG includes a speakerphone and video camera to provided for video telephone services.

Services Provided by the RCG:

The following discussion refers to FIG. 1. The RCG has a main system processor that is responsible for all house keeping and traffic routing tasks. The Main CPU 19 routes data to and from the Ethernet Port 11, USB Port 12, Modem/DAA 41, DSP Engine 33, 802.11b/g Module 36 and the Display and Keypad 10.

The RCG provides a total telecommunications communications services package for residential and small business customers. With the RCG, a CLEC can offer its customers dialtone for up to three separate telephone numbers per residence (the limit of three telephone numbers is an arbitrary number based upon typical residential usage and is not a limit imposed by the system), all local and long distance services, 24/7 always-on Internet access, a host of custom messaging and calling features, as well as Broadband access and lifeline service. All of these services can be offered over a customer's existing POTS line, and it doesn't require any network infrastructure build out like DSL and Cable services. Because there is no expensive network equipment required, it can be readily deployed throughout the country to expand the CLECs customer base quickly.

The RCG is designed to enhance, not replace, the existing telephone line, enabling it to provide new combined packetized voice and data services. Meanwhile, all existing telecommunications infrastructure and equipment will continue to work seamlessly with the RCG. Aside from simply installing the low cost RCG device in the home telephone wiring, no other equipment needs to be purchased by either the home owner or telephone companies. This eliminates the tremendously expensive infrastructure costs for communications companies that are trying to provide voice services using DSL or cable modems.

The RCG VIP Home Gateway Features:

Up to three telephone lines i.e. numbers, over a single POTS line and/or wireless connection.
  Ethernet, USB and IEEE 1394 computer interfaces.
  Full G1, G2 and G3 FAX support.
  Full support for all CLASS services.
  Broadband networking for home computers and appliances as well as wide area networking using a combination of a plurality POTS lines connected to a plurality of RCGs and/or a direct wireless connection to a wireless access point. (These interfaces allow smart devices to communicate to other devices within the home, or over the Internet through the RCG.)
  Automated, remote upgradability and configuration. (Requires the customer to do nothing.)
  Transparent user operation. (User doesn't have to know that any new technology is being employed)
  100% compatible with existing public telephone system.
  Video Telephone capabilities.
  No local or long distance usage charges.
  No Internet access fees.
  Lower monthly communication costs.
  Multiple telephone calls at the same time.
  Voice messaging, follow me features, call forwarding, automatic call back, conferencing, custom call routing.
  Home networking capabilities, all CLASS calling features, high speed broadband networking, continuous 24/7 internet access. and many others.
  All of these features are available even while connected to the Internet.
  Very low cost of entry into the market, especially as compared to broadband alternatives.
  New calling features that are not currently available to home users.

DETAILED DESCRIPTION OF THE INVENTION

The preferred embodiment is detailed herein using the ubiquitous 802.11 wireless protocol. It is by no means insinuated that this is the only wireless scheme that can be used by this device; rather, it is intended that any wireless transmission scheme can be used for wireless communications between this device and other wireless devices as various applications may dictate.

System Initialization

Figure 1:
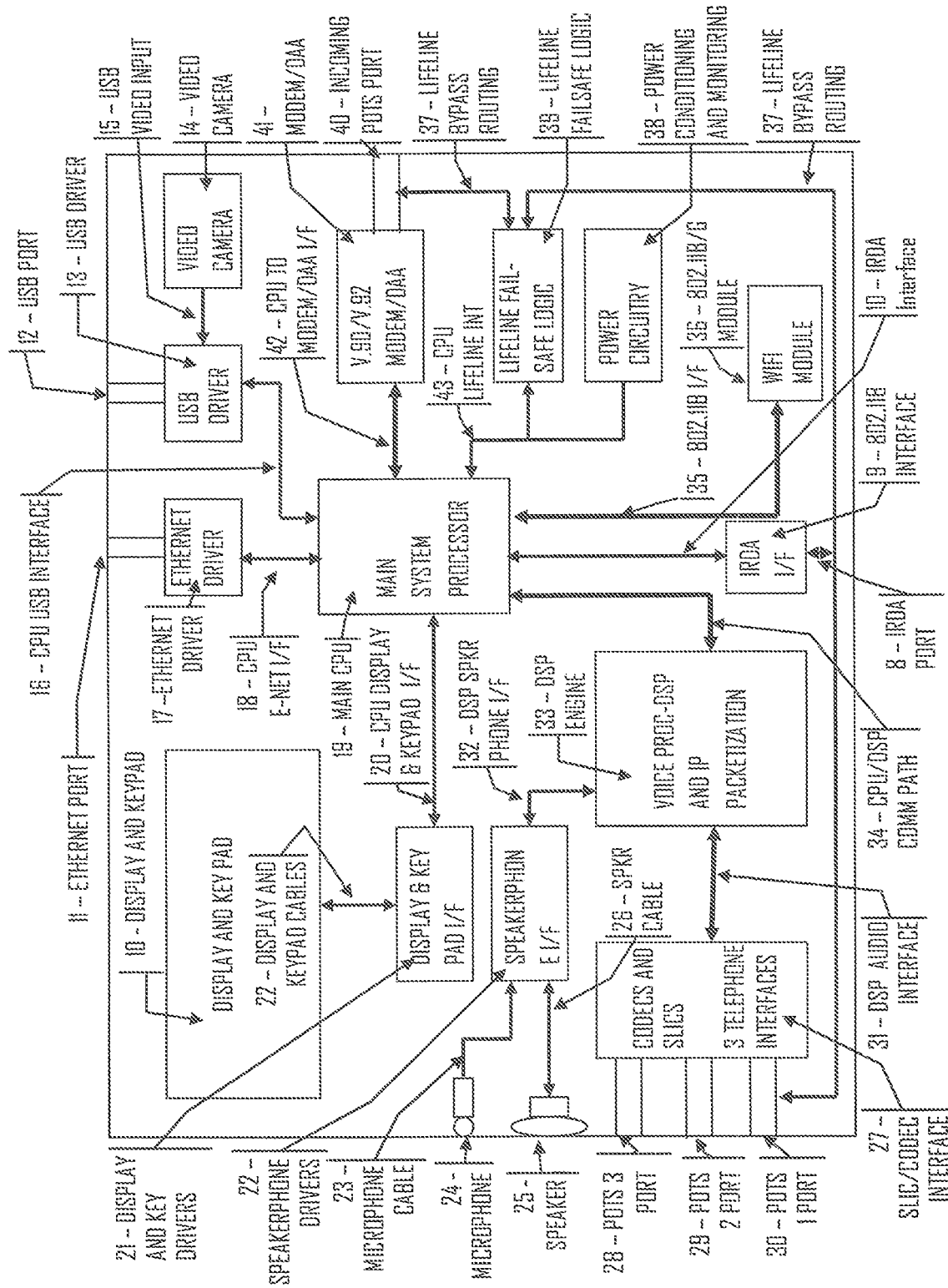
FIG. 1 shows the RCG functional block diagram with the preferred embodiment of an 802.11 wireless connection.
Figure 2:
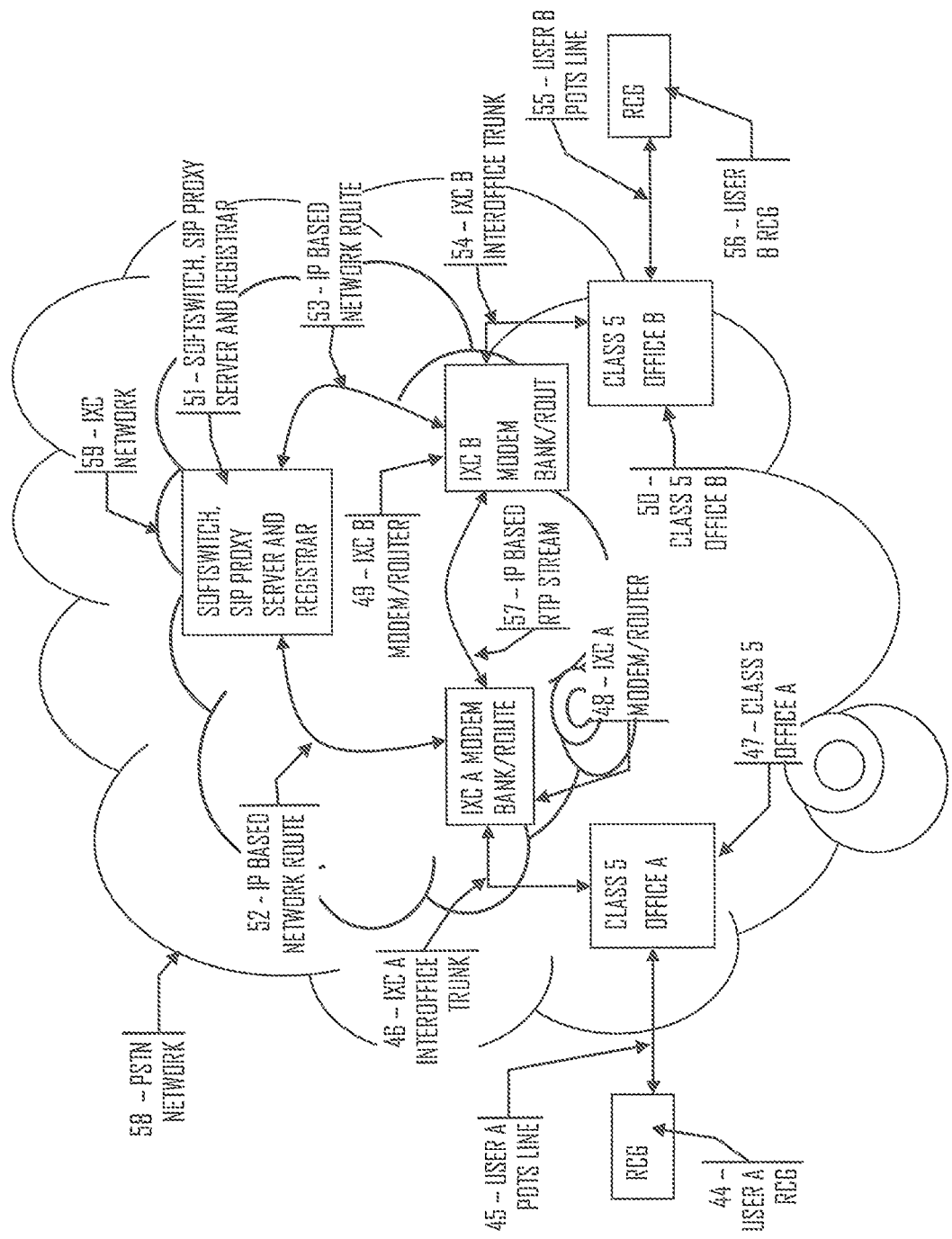
FIG. 2 shows the network topology for native RCG to RCG communications.
Figure 3:
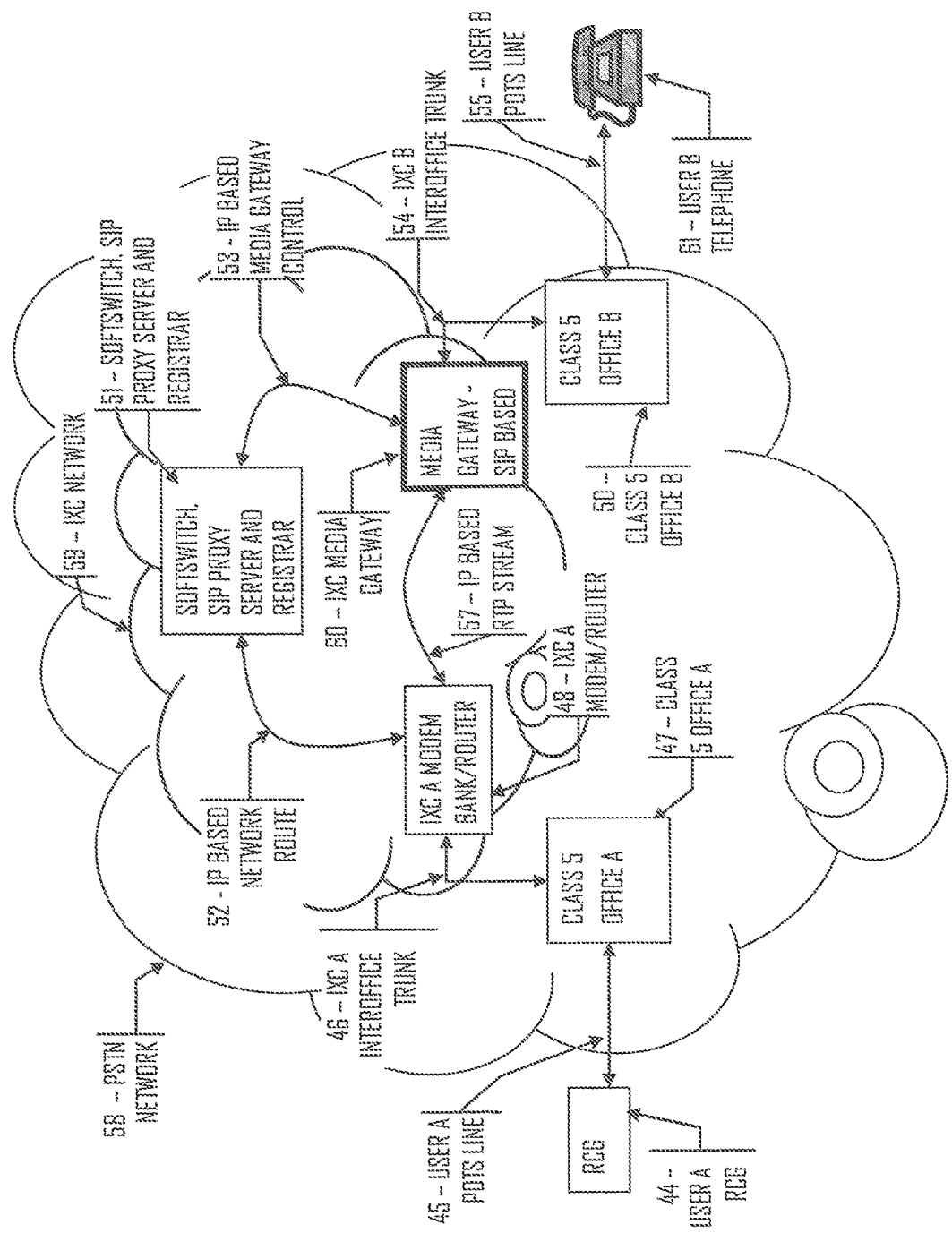
FIG. 3 shows the network topology for an RCG to PSTN call.
Figure 4:
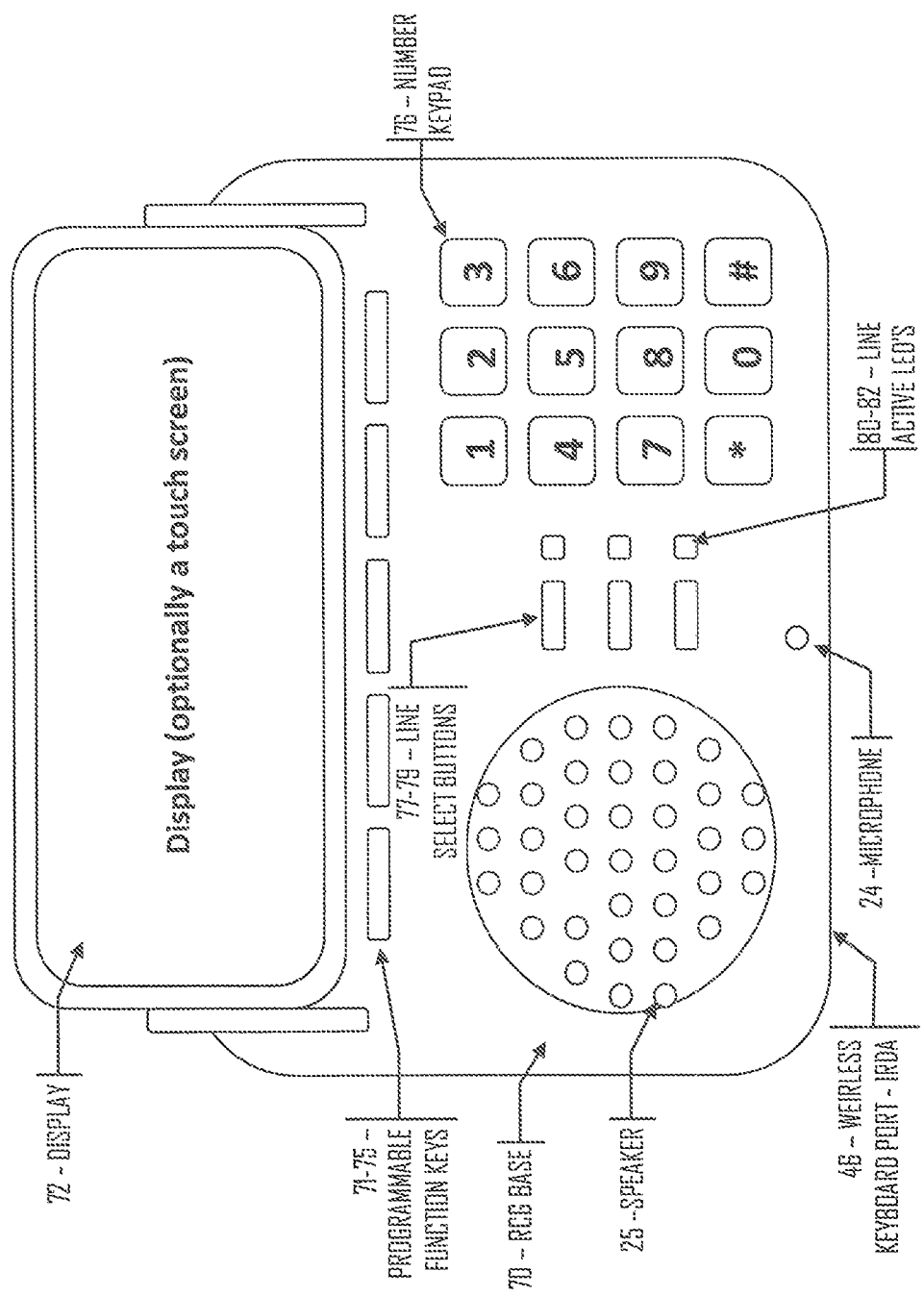
FIG. 4 shows the RCG top view with associated functions.
Figure 5:
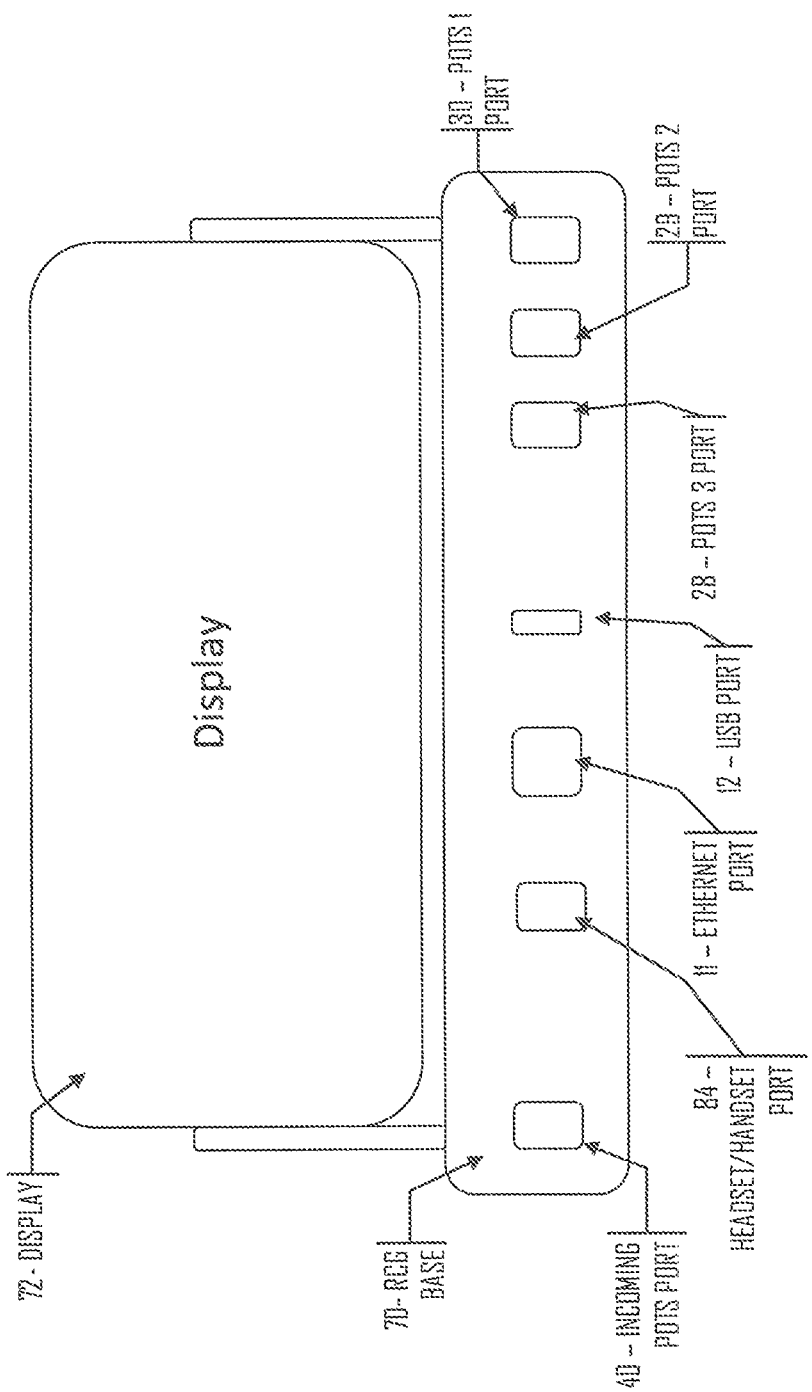
FIG. 5 shows the RCG rear view and associated connections.
Figure 6:
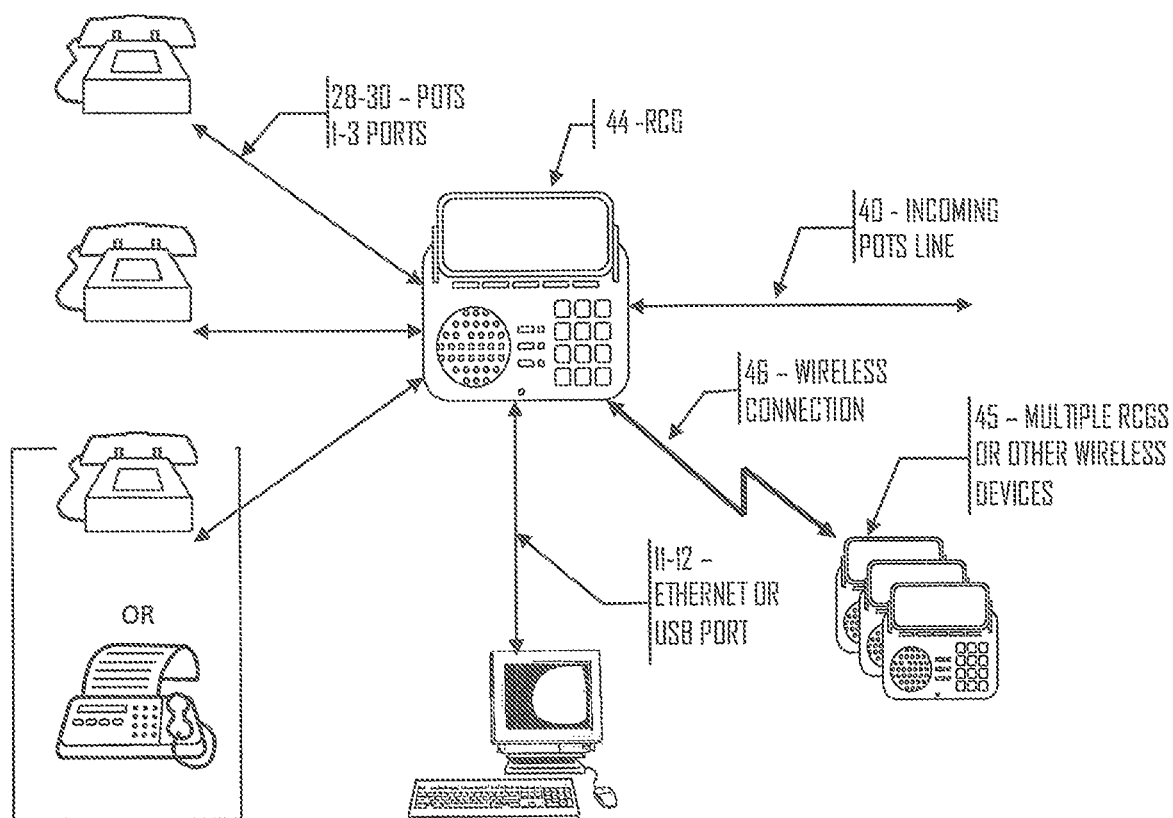
FIG. 6 shows a typical application with peripheral equipment connections.

Refer to FIGS. 1, 2 and 3 for the following discussion. When the RCG is first plugged into an AC power outlet the Main CPU 19, performs a Power-on Self Test (POST) routine. Once the POST completes and the RCG is connected to an active POTS line, connected to the LEC, by means of the Incoming POTS Port 40, the RCG automatically initiates a modem connection via the Modem/DAA 41, to a registration service via a toll free 800 telephone number. The registration service connects directly to the service provider's sales or customer service offices via a VoIP connection. An operator or an automated service answers the call and sets up a new account for the customer. Once the account is set up, the service provider's network automatically sends control information to the device to store the required routing and feature/service information in its non-volatile memory of its Main CPU 19. As part of this information, a local dialup telephone number is sent to the device that it will use for local network access in the same fashion as a standard ISP connection is made from a home computer. The URL of the Softswitch/SIP Proxy Server and Registrar 51 that will be controlling this particular device is also stored at this time. During the service activation and configuration process, the customer service operator can send test requests to the device, as well as call into it on another telephone number (assuming an additional telephone number is part of the users class of service) or the speakerphone to verify that it is configured and working properly. The final step of the configuration and initialization process is to register the device with the appropriate Softswitch/SIP Proxy Server and Registrar 51 so that the Softswitch/SIP Proxy Server and Registrar 51 knows that it is the controlling SIP Proxy for this RCG. Also configured at this time is the username/password verification server (this is a standard network device and is not shown) that is used to allow the RCG's modem to make a connection onto the service provider's network. Once the RCG configuration is completed, it disconnects the call by hanging up the Modem/DAA 41, then dials the new local network access number that had been sent during the configuration process and establishes a constant local network connection. This connection is maintained continuously on a 24/7 basis, and is immediately reestablished whenever it drops. Should the RCG become unable to reestablish this connection after several tries, it will switch over to failsafe mode and inform the user via the Display and Keypad 10. The RCG will try to reestablish the connection every few minutes until it finally succeeds.

By default, the first telephone port, POTS 1 Port 30, is assigned as the termination port for the existing POTS service that is connected to Incoming POTS Port 40. This is the existing telephone service that the user already has as his primary telephone service from his LEC. POTS 1 Port 30, typically has connected to it a standard telephone set that does not require any power (other than that derived over the POTS interface) to operate properly. POTS 1 Port 30 is the Lifeline telephone port for the user. In the case that all power is lost to the RCG, POTS 1 Port 30 will fail to a direct connection to the Incoming POTS Port 40 telephone line that comes into the RCG from the LEC to provide uninterrupted telephone services to the user. In this state, however, none of the enhanced VoIP services of the RCG are available to the user since the user simply has a stand POTS telephone service to the LEC.

Two additional and unique telephone numbers can be assigned to the other two telephone ports, POTS 2 Port 29 and POTS 3 Port 28, by the service provider at any time. These numbers are drawn from a pool of available telephone numbers assigned to the service provider. POTS 2 Port 29 and POTS 3 Port 28 must to have standard telephone numbers assigned to them so that the PSTN is able to route calls from its network to these ports. For calls originating from IP based telephones, these numbers are not necessarily needed since POTS 1 Port 30, POTS 2 Port 29 and POTS 3 Port 28 are uniquely identifiable to IP networks via their IP addresses assigned through the Dynamic Host Configuration Protocol (DHCP) at the time that the RCG establishes a connection to the service provider's network. Since POTS 2 Port 29 and POTS 3 Port 28 must have a telephone number assigned to them, it is a matter of convenience to use the assigned telephone numbers as part of their SIP address for IP routing of their data. In this way, all three user POTS ports, POTS 1 Port 30, POTS 2 Port 29 and POTS 3 Port 28 are all addressed the same manor.

At this point, the user is able to take advantage of all of the RCG's features that have been activated according to his service agreement. The user can at any time connect additional telephones, a computer or a computer network to the RCG. The user will only be able to use those telephone ports (POTS 1 Port 30, POTS 2 Port 29 or POTS 3 Port 28) that have been activated, and assigned unique telephone numbers by the service provider. Any type of standard telephone can be connected to the three POTS ports, POTS 1 Port 30, POTS 2 Port 29 and POTS 3 Port 28. In the event that a cordless telephone or a telephone that derives its power from an AC outlet is connected to POTS 1 Port 30, the lifeline functionality of this port will be ineffective since the telephone itself will not operate once power is lost.

The speaker phone feature of the RCG, comprised of Speakerphone Drivers 22, Microphone 24, Speaker 25 and DSP Engine 33, can be used on any of the activated telephone numbers and is by default enabled to operate on POTS 1 Port 30. Once either of the other two telephone ports, POTS 2 Port 29 or POTS 3 Port 28, is activated, the speakerphone function is activated for those lines as well. To use the speakerphone for any assigned telephone number, the user simply presses either the Line Select Button 79-81 for Line 1, Line2 or Line 3 on the face of the RCG, and the speakerphone function is activated on that line. This is convenient for answering any call directly at the RCG. The RCG may or may not have a number keypad for originating calls. This feature may be added or removed based upon the target market price points.

The determination as to which Inter Exchange Carrier (IXC) the RCG will route its data through is determined by any of a number of criteria including, but not limited to, whether the RCG is a private labeled product, or which carrier has the lowest cost routing, or if a specific carrier is specified by the customer, or and number of other considerations. The RCG can be programmed to change its routing path to any IXC at any time by the service provider. Complicated routing algorithms can be programmed into the RCG to control which IXC it will use at any time.

Failsafe Mode

During any time that the RCG is in failsafe mode i.e. Lifeline failsafe logic 39 is activated, the RCG will only be able to receive or initiate telephone calls via the telephone connected to its primary telephone port, POTS 1 Port 30 or through its speakerphone feature. In this condition, all activated telephone numbers are ported via the PSTN to the primary (first) telephone number for delivery to the user's telephone that is connected to POTS 1 Port 30. While in failsafe mode, the modem is not activated, and the RCG appears to the local Class 5 office as a standard telephone, and the PSTN will route all incoming calls to the RCG as it normally would to any standard telephone.

Call Flow 1:

Dialed call origination from a telephone connected to an RCG POTS port and terminating at another user's RCG POTS port:

When a user picks up a telephone connected to any of the three POTS ports, POTS 1 Port 30, POTS 2 Port 29 and POTS 3 Port 28, an off hook condition is detected by the SLIC/CODEC Interface 27 that is connected to the DSP Engine 33 by way of the DSP Audio Interface 31. The DSP Engine 33 responds by sending digitally generated dialtone to the appropriate POTS interface over the DSP Audio Interface 31. (Note: all BORSCHT telephony functions are performed by the DSP Engine 33 and the SLIC/CODEC Interface 27.) Upon hearing the dialtone, the user enters the desired telephone number on his telephone keypad. The Dual Tone Multi-Frequency (DTMF) digits that the user dials are decoded within the DSP Engine 33. The dialed digits are transferred to the Main CPU 19 via the CPU/DSP Communications Path 34. The Main CPU 19 polls the DSP Engine 33 approximately every two milliseconds looking for data. The Main CPU 19 polling rate varies according to the process that is being performed. The CPU/DSP Communications path 34 also can generate an interrupt to force data transfer between it and the Main CPU 19.

The Main CPU 19 generates a SIP Invite IP packet using the dialed digits as the called destination address and the URL of its local controlling SIP Proxy Server which was programmed into the RCG during the configuration process. The Main CPU 19 passes this SIP packet off to the Modem/DAA 41 for transmission over the network. The RCG Modem/DAA 41 is connected to and communicating with a modem in a modem bank located in the Inter Exchange Carrier's (IXCs) facility. This facility may actually be located in the LEC's physical plant or it may be physically located at another location.

Referring to FIG. 2, User A RCG 44 is connected via its modem to the LEC's local Class 5 Office A 47. In this example, the service provider's connections to the IXC A Modem Bank & Router 48 are through IXC A Inter-Office Trunks 46. The service provider may or may not be the IXC. If the service provider does not have its own network, then it will purchase capacity from an IXC and route its traffic to that IXC's facilities. The SIP Invite IP Packet that is sent from User A RCG 44 transits the LEC's Class 5 Office A 47 facilities and is routed to the IXC A Modem Bank/Router 48 via the IXC A Inter-Office Trunks 46. It is the job of the router to take the IP packet and route it on to its intended destination, in this case the appropriate SIP proxy server 51. The router uses the URL for the Softswitch/SIP Proxy Server and Registrar 51 contained in the SIP Invite to know where to route the packet. (Note: The Softswitch, SIP Proxy Server and Registrar are logical devices that may reside in a single computer system, or may be implemented as completely separate devices. In this example, the Softswitch, SIP Proxy Server and Registrar are all shown as a single physical device running these three separate processes.) The IXC A Modem Bank/Router 48 sends the SIP Invite IP packet on to Softswitch/SIP Proxy Server and Registrar 51 via an IP based network route 52.

The SIP Proxy Server process running on Softswitch/SIP Proxy Server and Registrar 51 performs a look up to determine the termination destination for the call using the dialed digits passed along in the SIP Invite IP packet. In this example, the terminating device for User B RCG 56 is via IXC B's Modem Bank/Router 49 then through Class 5 Office B 50 and over User B POTS line 55 and finally to User B RCG 56. Not covered in detail here is the SIP message handling since it is completely covered in IETF RFC2543. This example shows that both the originating and terminating ends of this call are controlled by the same Softswitch/SIP Proxy Server and Registrar 51 device. Where the originating and terminating ends of a call are controlled by different Softswitch/SIP Proxy Server and Registrar devices, an additional level of SIP messaging is used between the two SIP Proxy Server processes of each of the Softswitch/SIP Proxy Server and Registrar devices to locate and control the terminating location of the call. Again, that information is covered in IETF RFC2543 and is repeated here.

After the call routing is setup using SIP, and User B answers the call, the Softswitch/SIP Proxy Server and Registrar 51 device sends IP address of the originating User A RCG 44 to the User B RCG 56 and the IP address of User B RCG 56 to User A RCG 44. Once both RCG's have the other's IP address, they then communicate directly to each other using Real Time Protocol (RTP), and the Softswitch/SIP Proxy Server and Registrar 51 device is no longer part of the connection. This direct communication is shown as IP based RTP Stream 57 between IXC A Modem Bank/Router 48 and IXC B Modem Bank/Router 49.

On the receiving end of the call, referring back to FIG. 2, User B RCG 56 receives the SIP Invite data stream through its Modem/DAA 41 and passes it on to the Main CPU 19. The Main CPU 19 reassembles the SIP IP packet and interrogates the header information to determine which POTS port, POTS 1 Port 30, POTS 2 Port 29 and POTS 3 Port 28 the call is destined for based upon the dialed number contained in the SIP Invite message. The Main CPU 19 commands the DSP Engine 33 to control the SLIC/CODEC Interface 27 to apply ringing voltage to the selected POTS port to ring the phone. A corresponding SIP 180 (ringing) message is sent back to User A RCG 44 in the reverse direction. When the phone attached to the selected POTS port is answered, the off hook condition detected by the SLIC/CODEC Interface 27 is sent through the DSP Engine 33 to the Main CPU 19 that sends the SIP 200 OK message back to User A RCG 44 to let the RCG know that the call was answered by User B RCG 56 and to turn off the audible ringing tone for User B. Once the call is established, User A RCG 44 sends and ACK F12 SIP message to User B RCG 56 indicating that User A RCG 44 understands that the call setup has been completed.

The two RCGs now exchange SIP messages that include the type of voice encoding that will be used such as G.729, G.723.1, G.711 etc to configure their RTP streams so that they can reliably transfer the user information between them. At this point the call (voice data) is sent between both RCGs and a normal telephone conversation takes place between the user A and user B.

Call teardown is accomplished by either user hanging up their telephone. The RCG of the terminating end (the end that hangs up the phone first) detects the on-hook condition and sends a SIP Bye message to the other end. The other end upon receiving the SIP Bye message responds with an OK 200 SIP message and disables the appropriate POTS port that the user was using.

The Speakerphone interface can be used for either end of a telephone conversation in exactly the same way as described above except that the corresponding POTS port that the call was intended for is disabled if the call is answered via the speakerphone.

Call Flow 2:

Calls between an RCG device and a PSTN telephone:

Refer to FIG. 3 for the following discussion.

In the previous call example, the PSTN network had nothing to do since the call was over a previously established modem connection between two RCGs. In the cases where a call originates or terminates to a standard telephone serviced by a Class 5 office, the process is a bit more complicated.

When a call originates from a user via an RCG, such as User A RCG 44, the call handling practices are exactly the same up to the point that the SIP Proxy Server process in the Softswitch, SIP Proxy Server and Registrar 51 performs a lookup to determine how to route the call. In this case, the SIP Proxy Server process determines that the call terminates at a standard PSTN telephone attached to the Class 5 Office B 50. Since the call originates as a native VoIP service, it must be converted to a standard switched circuit based service to be able to be delivered to User B's telephone 61. The conversion is performed by the IXC's Media Gateway 60 device. In this example, the SIP Proxy Server process routes the call via the IXC's Media Gateway 60 device instead of through the IXC B Modem Bank/Router 49 as before. The SIP Proxy Server process sends a SIP Invite to the IXC's Media Gateway 60 device, as well as other control information, to direct the Media Gateway 60 device to terminate the call and to apply the appropriate voice compression algorithm to the media stream to convert it between switched circuit PCM format and the selected VoIP protocol. At the same time, the Softswitch process of the Softswitch, SIP Proxy Server and Registrar 51 device sends commands to the Media Gateway 60 device to cause it to route the call's PCM data to a specific channel on the IXC B Interoffice Trunk 54. The Softswitch process then generates an SS7 ISUP message that is sent over the PSTN SS7 signaling network to the Class 5 Office B informing it of the incoming call and on which circuit the call has been placed. It is up to the PSTN at this point to ring the User B telephone 61 and process the call between the IXC's Media Gateway and the User B Telephone 61. The Softswitch process handles the signaling conversion between the PSTN's SS7 network and the IXC's SIP messaging, as well as any other proprietary signaling schemes utilized by the IXC to control its network. The standard SS7 call control messages, such as ringing, busy, ring back etc., all have a comparable SIP call flow control messages. The Softswitch simply maps the SS7 messages into SIP messages and visa-versa while routing the messages to the appropriate network equipment.

As in the case of a call between two RCGs, the RTP media stream (the actual call data) is routed directly be the IXC A Modem Bank/Router 48 and the IXC's Media Gateway 60 via an IP based RTP Stream 57.

Again, call teardown is accomplished by either user hanging up their telephone. Depending which end hangs up the phone first, the associated network will generate the appropriate messages which will eventually make it back to the Softswitch process. The Softswitch process will relay the appropriate call control messages between the PSTN and the IXC's SIP based control system.

A telephone call originating from a PSTN telephone is configured and setup in the same fashion as the above description except that the originating messaging begins within the PSTN network instead of the IXC's network.

Personal Computer Based Communications:

Where the RCG is connected to a Personal Computer (PC) through either its USB Port 11 or Ethernet Port 12, the RCG operates exactly as a cable or DSL type modem device. The RCG is simply a pass through for the computer's data. The RCG receives the IP packets (of whatever type) from the computer and sends the information unchanged to the Modem/DAA 41 interface for transmission over the Internet. Received information from the Internet is processed in the reverse way.

Dynamic Bandwidth Allocation:

When a modem connection is established between the RCG and the "Network", the total available bandwidth of this connection is used in a shared/prioritized fashion. Voice services (calls) take precedence over data services. Therefore, when no calls are in progress all of the available bandwidth is used by data type services such as surfing the Internet or uploading/downloading files. However, when a call is to be passed through the RCG, the required bandwidth for the call is deallocated from the data services and prioritized for the telephone call. This necessary because the Quality Of Service (QOS) is important for effective communications over electronic networks. Since the voice data is carried over a "data centric" network topology (an IP based network), call quality can suffer greatly. Every effort must be taken to eliminate or reduce the packet delay through every network element to be able to provide the best call quality. For data applications such as surfing the Internet or downloading files packet delay is acceptable and expected, and it does not affect the "quality" of the data.

Since all voice and data is transmitted as packets, there are no "time slots" or other type of "channelization" associated with the transmission of this data over either the POTS line or the wireless interface. Channelization of the voice data does occur within the SLIC/Codec Interface—27 but is converted into IP packets by the DSP engine—33 and is handled as packets from that point on.

Regardless of whether the call is originating or terminating at the RCG, the bandwidth allocation process is the same. When the SIP call setup messages are processed, the type of voice compression that will be used is defined. The RCG Main CPU 19 handles the IP packet flow between the DSP Engine 33, USB Port 12, Ethernet Port 11, 802.11b/g Module 36 and the Modem/DAA 41 devices giving priority to the voice packets to and from the DSP Engine 33 and the Modem/DAA 41 interfaces. Voice compression algorithms create IP packets at a specified number of packets per second. These packets are handled by a timed process in the RCG. This process is started during call setup so that the packets are handled at the correct rate based upon the compression algorithm's packet generation rate. There is no priority assigned between the voice packets of each of the three different POTS Ports 28-30. When more than one voice call is in progress, they are handled in a round robin fashion based upon the packet rate for the compression algorithm used. If, for example, two calls are using a compression scheme that generates packets every 2 milliseconds, and the third generates packets every 4 milliseconds, then the calls utilizing the faster packet rate will be polled at twice the rate as the call using a slower packet rate but they are not given priority "over" the other call. Only when there are no voice packets ready for transmission to the Modem/DAA 41, i.e. during the approximately 2 to 4 millisecond packetization period between packets, will any pending data packets received from the USB Port 12, Ethernet Port 11 or the 802.11b/g Module 36 be sent to the Modem/DAA 41 for transmission over the network.

Thus, the POTS bandwidth is allocated on a per packet basis, not on a "time slot" or "channelization" or even a "frequency" basis as it the case with T-Carrier, DSL or channelized DSL systems. The same is true for the wireless interface, whether it is carrying pure data or voice.

Security is currently a big concern in today's networks, and especially with wireless 802.11 transmissions. For this reason, the RCG defaults to route voice data over the users POTS connection via Incoming POTS Port 40. As security concerns regarding wireless communications transmissions are addressed and alleviated, voice call data can, and will, be routed over the wireless interface via the 802.11 b/g Module 36.

FAX Transmission:

Group 1, 2 and 3 fax transmission is completely supported by the RCG. Fax transmission has the same priority as other voice communications. That is to say that FAX transmission is treated the same as a voice call and takes precedence over native IP data traffic.

Broadband Over POTS:

One of the primary functions of the RCG is to be able to transfer large files such as video files over the POTS lines to a residence. The ability to do this is limited by the maximum of 56 Kbps due to the design of the digital Class 5 office linecards and network transmission schemes based upon T carriers. Typical Class 5 linecard design samples the POTS lines at a rate of 8,000 samples per second. Typically, each sample is digitized into 12 to 16 bits by a codec device. The digitized sample is then companded to an 8 bit sample (1 byte) which makes up the PCM data stream that is transferred over the PSTN. Therefore, each POTS line is sampled at an effective rate of 64 Kbps. Since legacy T1 transmission equipment uses robbed-bit signaling, the maximum guaranteed transmission rate for the PSTN as a whole is 56 Kbps. Because of this limitation, standard POTS lines can only guarantee a maximum of 56 Kbps transfer rate under the best conditions. DSL equipment gets around this problem by installing DSL Access Multiplexing (DSLAM) equipment at the Class 5 office end of the POTS line. By routing around the linecard, as well as routing the data directly over the Internet or other private IP based networks, and therefore the 64 Kbps sampling rate, DSL is not bandwidth limited like PSTN traffic is. DSL, however, suffers from the very high costs associated with the purchase, installation, maintenance, floor lease costs, etc. DSL also suffers from very high deployment costs resulting from the labor intensive process to turn up each line. Each DSL "POTS" line must be inspected, conditioned and all load coils removed.

The RCG gets around the 56 Kbps POTS limitation as well as the DSL problems by using the standard POTS lines as they are, and not requiring any additional equipment to be installed at the Class 5 end of the POTS line. This technique simplifies deployment and drastically cuts costs.

Figure 7:
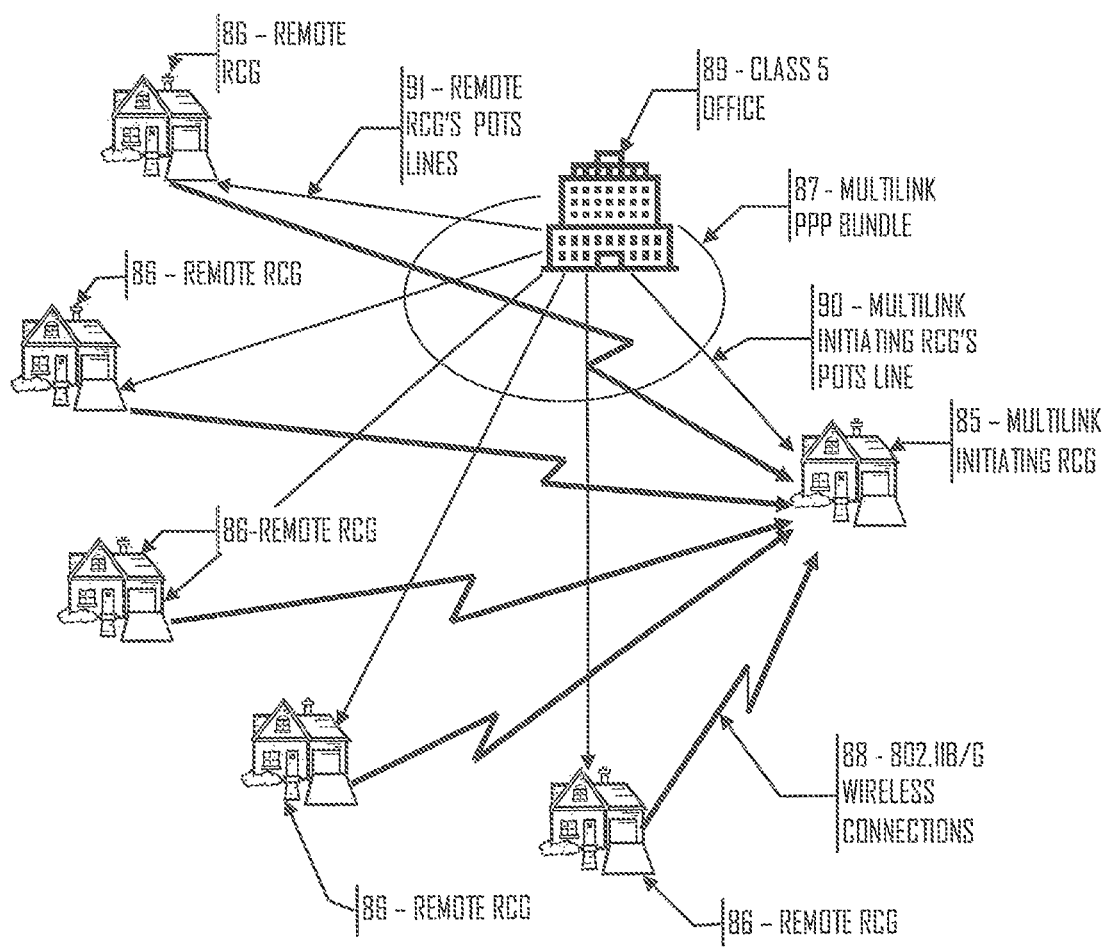
FIG. 7 shows an ad-hoc wireless LAN configuration with ppp multilink data distribution and wireless connectivity.

Multilink PPP Connections:

Referring to FIG. 7, the RCG implements broadband over POTS by employing an 802.11 b/g wireless interface to configure a multilink PPP bundle—87 (per RFC 1990) comprised of the POTS lines connected to up to 32 RCGs. The limitation of 32 RCGs in a multilink PPP bundle is an arbitrary number and can be scaled up or down as required to support changes in network equipment capabilities. An 802.11b/g interface—87 is shown as the preferred embodiment, since its 11/54 Mbps interface is considered sufficient bandwidth at this time also, its transmission distances are sufficient for implementation of this device, as opposed to other shorter ranged wireless transmission schemes. However as time goes on, some other wireless interface may be more desirable. There is nothing special or specific to the 802.11 wireless interface that makes it particularly suited to this application. Any wireless interface scheme can be used to implement this device.

The 802.11b/g interface—88 on an individual RCG is also used to provide a peer-to-peer wireless home networking environment to other 802.11 compatible wireless component within the residence (such as a hand-held computer device) while acting as an always on dialup Internet gateway over the POTS line—40 for the other wireless devices. An RCG that is transferring a very large file can request the services of 31 (in this embodiment) other RCGs to assist in the file transfer using their respective POTS lines. A single RCG can therefore gain the combined bandwidth of up to 32 POTS lines transferring data at as much as 56 Kbps each to transfer information. This is roughly equivalent to a transfer rate of 1.79 Mpbs in the inbound direction (towards the RCG) and approximately 1.075 Mbps in the outbound direction (towards the PSTN).

The multilink PPP connection—87 is initiated by an RCG when it determines that the file (or streaming service) that it is to download (receive) is of sufficient size or requires a minimum amount of bandwidth to justify the use of a multilink PPP connection. This determination can be made on many different criteria such as the file size, type of data being transmitted, the type of compression if any, a Quality-of-Service requirement or any other pertinent information. (Since a certain amount of overhead is required to set up a Multilink PPP connection, it doesn't make sense to use it for small or low data rate transfers.)

Multilink PPP Bandwidth Allocation and Initialization:

Referring to FIG. 7, an RCG—85 that decides to initiate a multilink PPP session with a remote computer i.e. internet URL, requests a multilink PPP session with that URL resource via Link Control Protocol (LCP) session management. The initiating RCG—85 and the remote server computer (not shown) will negotiate the pertinent multilink parameters such as compression, packet size, sync/async, link quality monitoring, bit stuffing etc. As part of a successful multilink PPP session setup, the initiating RCG—85 receives a multilink PPP session ID, or "magic number", which is used to identify this particular multilink PPP session and is also used for adding or removing links from the multilink bundle—87. Once the multilink bundle is setup, the initiating RCG—85 begins data transfer across its POTS interface—90 with the far end computer system. The initiating RCG—85 then looks up the addresses of up to 31 (in this embodiment) other RCGs in its router tables to use for the multilink PPP transfer. (If a Neighborhood Access Point is available the RCG could request service through it instead of setting up a Multilink PPP connection—see FIG. 8.) The initiating RCG—85 determines the number of remote RCGs—86 that it wants to use to get the desired bandwidth for the transfer and sends multilink PPP service requests via the 802.11 b/g wireless connections—88 to the selected remote RCGs—86. The selected remote RCGs—86 respond back to the initiating RCG with either an acceptance or denial of multilink PPP service request. This decision is made based upon the remote RCG's currently available POTS bandwidth and the current local demands for that bandwidth. The remote RCG—86 makes a decision to participate in a multilink PPP service for an initiating RCG if its POTS line—91 has a current average bandwidth utilization of less than some arbitrary limit such as 8 Kbps to 16 Kbps. This 8 Kbps to 16 Kbps bandwidth utilization represents about two concurrent voice conversations using standard voice compression techniques, or some small amount of data transmission occurring on the remote RCG's POTS interface—91 or a combination thereof. Assuming that the remote RCG—86 has a modem connection speed somewhere between 33 Kbps to 56 Kbps, this would leave approximately 17 Kbps to 40 Kbps of POTS bandwidth that the remote RCG—86 could offer to the initiating RCG—85 for use in its multilink PPP bundle—87. Of course, if there is no activity on the remote RCG—86 POTS line, then the entire bandwidth will be used for the multilink transfer. If the remote RCG—86 accepts the multilink PPP service request from the initiating RCG—85 it also sends its currently available bandwidth on its POTS line—91 that the initiating RCG—85 will have available to it for the multilink PPP transfers. The initiating RCG then selects which of the responding remote RCGs—86 it will use for the multilink PPP bundle—87 and sends them a multilink initialization packet containing the URL of the destination as well as the multilink PPP session ID (magic number) and any other pertinent information required for the remote RCG to join in the existing multilink PPP bundle—87. Each remote RCG POTS interface—91 participating in a multilink PPP bundle, represents a logical "link" in the initiating RCG's multilink PPP bundle—87. The remote RCGs—86 then send a multilink PPP packet (over their respective POTS lines—91) to the destination URL with the multilink PPP session ID and request to be added to that multilink PPP bundle—87. The destination URL accepts the request of each of the remote RCGs—86 and begins sending data packets to each over their respective POTS lines—91. When the remote RCGs—86 receive data packets sent over their respective POTS lines—91, that are destined for the multilink PPP bundle—87, they simply relay the data packets over their 802.11b/g interface—88 to the initiating RCG—85. It is the responsibility of the initiating RCG—85 to perform all housekeeping tasks associated with the multilink transfer such as detection of lost packets and data packet reassembly, if those functions are required. Typically, lost packet detection and retransmission and reassembly are performed at higher OSI layers by the requesting software such as a browser. The remote RCGs—86 are simply data transport nodes and do not perform any data processing on data received over a multilink PPP bundle destined for another RCG.

The initiating RCG—85 of the multilink PPP bundle—87 continually monitors the bandwidth of each remote RCG's—86 multilink link which together comprise its multilink bundle —87. When the available bandwidth for the multilink PPP link of an individual remote RCG—86 falls below an arbitrary minimum set by the initiating RCG—85, the initiating RCG—85 instructs the offending remote RCG, via its 802.11b/g wireless interface—88, to remove itself from the multilink bundle. The remote RCG—86 will then notify the remote computer (URL) to be removed as a link in the current multilink bundle on which it is participating. Alternatively, a remote RCG—86 can inform the initiating RCG—85 of local demands on its POTS bandwidth, and request that the initiating RCG—85 remove it (the remote RCG—86) from the participation in the initiating RCG's multilink bundle—87. The remote RCG—86 will not unilaterally remove itself from participation in a multilink bundle without prior notification to the Initiating RCG—85. The remote RCG—86 must get authorization from the initiating RCG—85 to remove itself from the bundle, since the initiating RCG—85 will have no way of knowing if the loss of data from that remote RCG is due to some sort of failure or from the remote RCG simply removing itself from participation in the multilink bundle—87. Also, for services that require a minimum Quality of Service (QOS) such as streaming video, the initiating RCG—85 needs to control the multilink bundle—87 bandwidth, and it can not do that if remote RCGs—86 drop out of the multilink bundle—87 at will. When a remote RCG—86 requests to be removed from participation in a multilink bundle—87, the initiating RCG—85 must immediately grant the request. If the initiating RCG—85 were to not grant the request, then the remote RCG—86 could, in worst case, delay or drop incoming multilink packets destined for the initiating RCG—85. If this were to happen, the initiating RCG—85 will have missing packets and could over run its reassembly buffer (if reassembly is being performed by the RCG) causing catastrophic data loss and potentially have to restart the entire transmission. In the least case, the initiating RCG—85 would have to initiate retransmission of potentially many packets which it assumes to be lost, but may simply be delayed by the remote RCG—86. Once a remote RCG—86 has been removed from participating in a multilink bundle—87, the initiating RCG—85 will then look up another remote RCG in its router tables that can be used to participate in the multilink PPP bundle—87, and request that the new remote RCG—86 to join the existing multilink bundle—87. This is necessary to maintain a minimum Quality of Service. Since RCGs prioritize their bandwidth requirements based upon their own "local" service requirements, their participation in any multilink PPP service is available only to bandwidth that is not required for its own current local demands. Therefore, a remote RCG's—86 bandwidth that is available for multilink services can change at any time. The dynamic reassignment of remote RCGs that participate in a multilink bundle is also required to prevent a remote RCG—86 from receiving packets so slowly that the originating RCG—85 interprets this delay as lost packets. When the initiating RCG—85 determines that a packet has been lost, and it is performing packet reassembly, it will, itself, request that the remote computer retransmit the lost packet. The initiating RCG will not ask any remote RCG—86 to perform retransmissions or any other kind of data computations or manipulations.

Figure 8:
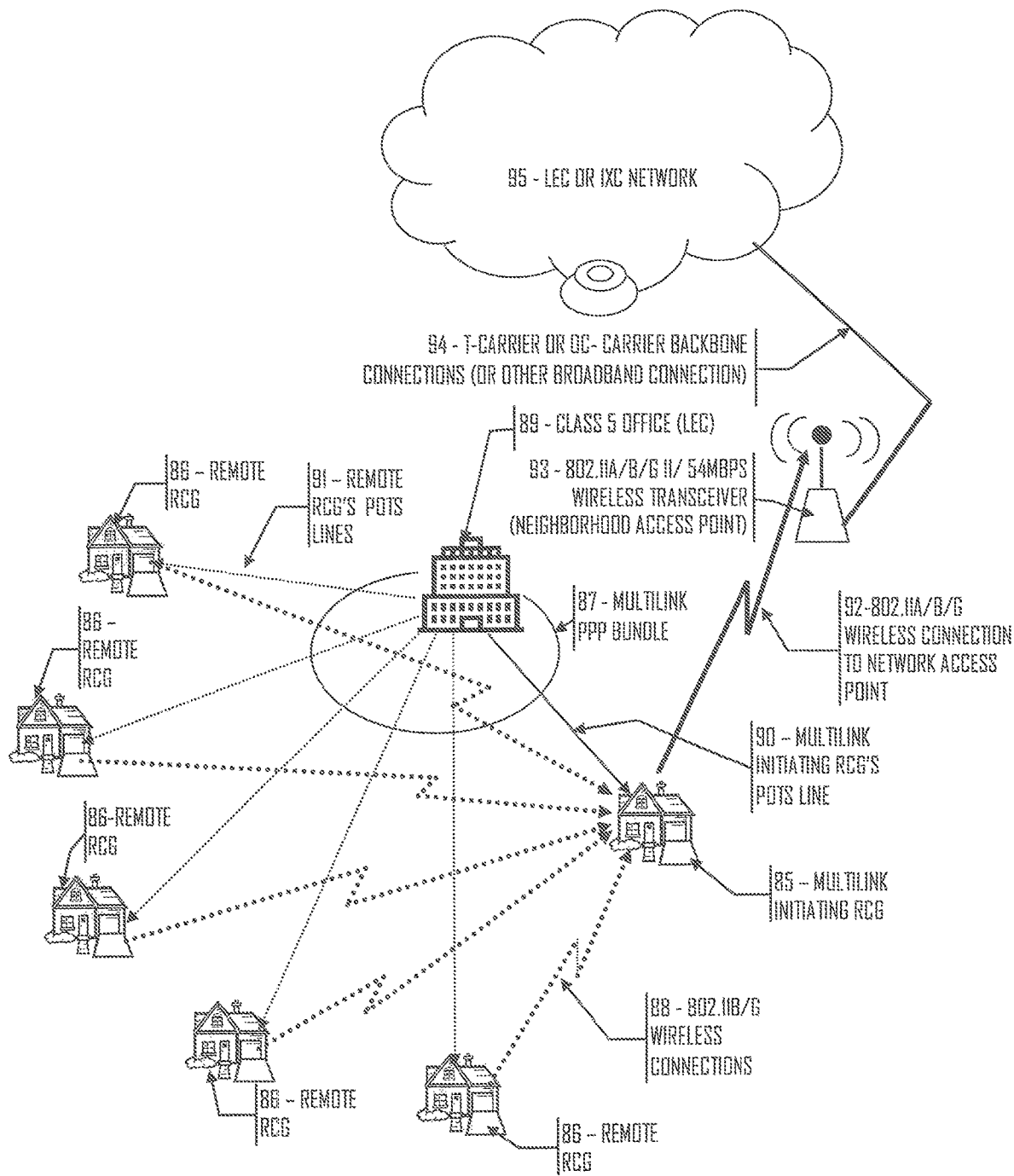
FIG. 8 shows an ad-hoc wireless LAN configuration with ppp multilink data distribution and wireless connectivity with connection to a broadband neighborhood access point (Wi-Fi hot spot).

Refer to FIG. 8 for the following discussion. In areas where there are existing 802.11 network equipment such as Neighborhood Access Point—93, or where there is sufficient bandwidth requirements from an installed base of RCGs to warrant the deployment of a Neighborhood Access Point—93, the RCGs will automatically detect the presence of the compatible neighborhood access points and register with that equipment for transport services. In this case, an RCG has an alternative broadband service route in addition to the multilink option. An RCG can communicate directly with a local 802.11 Network Access Point—93 that is connected to the PSTN or another carrier's network via some sort of high bandwidth backbone such as a T-Carrier or optical carrier connection (T1, T3, OC3, OC12 etc.). The RCGs can communicate directly with neighborhood access points at their full 11/54 Mbps data rates to provide up to that full bandwidth to the user. This functionality is, of course, subject to the Network Access Point—93 allowing access to its resources to the RCG according to the 802.11 wireless protocol.

This architecture is important since it provides an avenue to relieve the local class 5 offices of congestion that can be caused by a wide spread deployment of RCGs within the class 5 service area. Since each RCG requires a constant 24/7 modem connection, this ties up the class 5 switch in a fashion that it was not designed for. This could lead to wholesale class 5 office expansions which would be extremely expensive, and potentially prohibitive for the Local Exchange Carriers (LECs). By deploying neighborhood access points that operate at 54 Mbps (802.11a/g), in areas where the RCG concentration starts placing too high of a demand on the local class 5 office, the bandwidth from the RCGs can be aggregated by the neighborhood access points into large capacity backbones to relieve the switch congestion. In this case, the RCG POTS interface—40 can be used solely as a lifeline connection, or when the 802.11 wireless LAN in which the RCG resides is congested. With this implementation, voice calls will be carried over the wireless interface as opposed to the POTS interface on which they would normally be carried. Also, the RCG modem—41 connected to the POTS interface—40 would not need to maintain a constant always on connection, it could be a dialed on demand connection and thereby relieving the local class 5 office switch.

Figure 9:
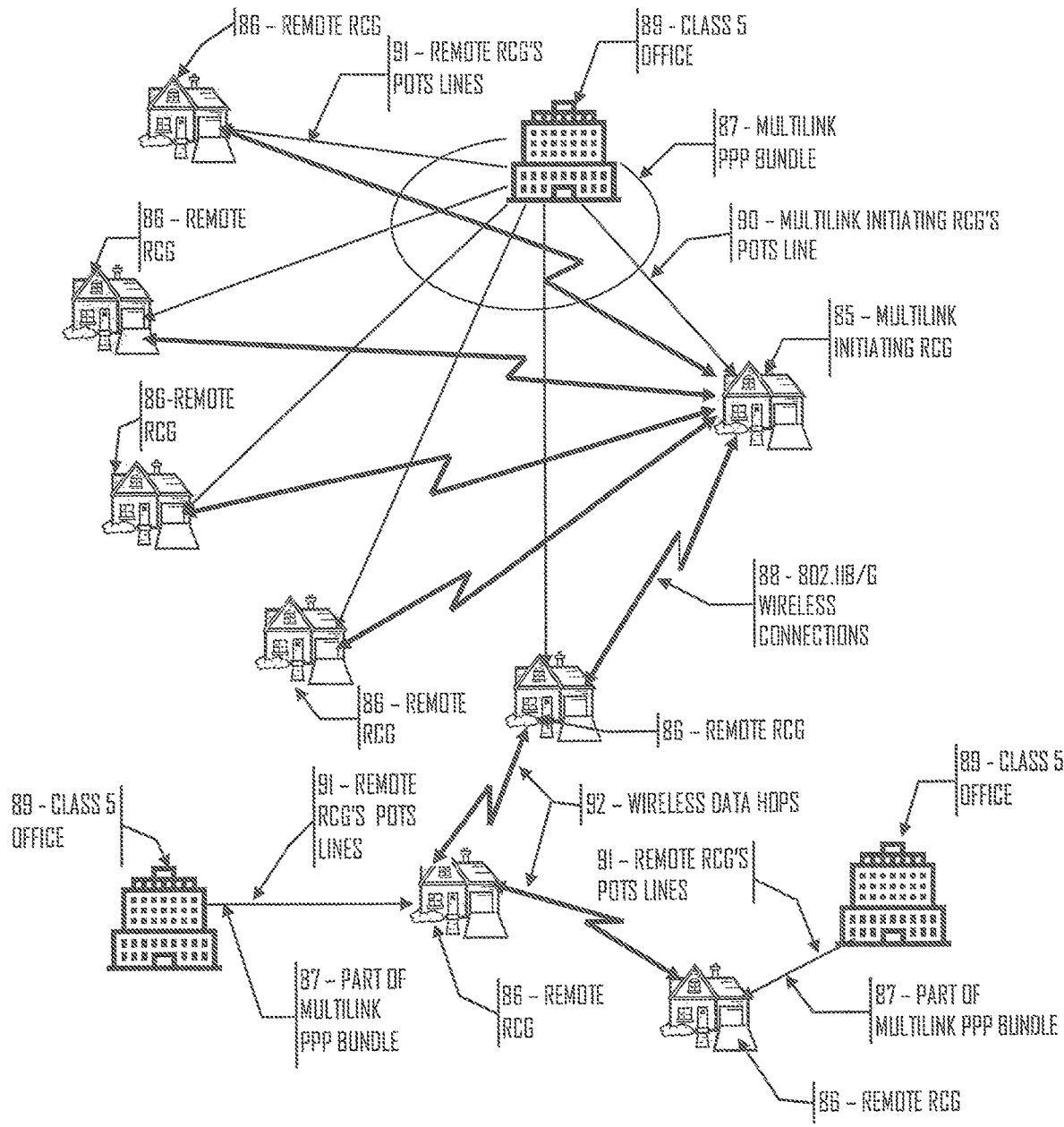
FIG. 9 shows an ad-hoc wireless LAN configuration with ppp multilink data distribution and wireless connectivity with wireless data hopping with POTS connections through numerous different Class 5 offices.

Bouncing or Hopping Traffic:

Refer to FIG. 9. In areas where the density of RCGs is less than the arbitrary number of 32 RCGs within its transmission radius for multilink connections, the RCGs can bounce, or relay, the data traffic between each other to reach other RCGs located farther than the RCGs wireless transmission area. Since the POTS data rate of 56 Kbps is miniscule as compared to the 11/54 Mbps 802.11b/g transfer rate, the overhead associated with bouncing data traffic is not a concern. This will allow for the fastest possible data transfer across POTS lines for every RCG user.

RCGs can also communicate directly with an 802.11a Neighborhood Access Point—93 device (such as that used in WI-FI networks) that is connected to a data network connection such as a DS3 or OC3 service via a Metro Access Point. Where an RCG has access to a broadband device such as an 802.11a type device, either directly or via a bounced signal across several RCGs, a direct high speed data connection can be used to transfer large files. When an RCG is communicating directly with an 802.11a device, data transfer speeds up to the full 11/54 Mbps can be achieved to speed video transfers for such applications as video on demand.

RCG Router Tables:

The RCG continually monitors its 802.11b/g wireless interface for transmissions from other RCGs or 802.11a Access Points as well as other 802.11b/g wireless devices within the residence. The RCG provides a means to identify and store the addresses of other RCGs and Neighborhood Access Points within its local area. The RCG creates routing tables, much like an IP router device, so that it knows which RCGs are local to itself, and how many hops will be needed to reach the maximum of 32 POTS lines or a Neighborhood Access Point. The RCG can then determine how to route its data transfers to gain the most efficient routing and network efficiencies.

The router tables in each RCG are continually updated by monitoring the 802.11 frames received from other RCGs or Network Access Points. The number of entries in the router tables can be limited to an arbitrary number of other RCGs but contains room for at least 32 entries. For each RCG listed in the router tables, certain information is kept such as signal strength, if the other device is another RCG or some other 802.11 compatible device, if the other RCG is reachable directly, or if it is accessed via another RCGs by hopping. In the case there RCG hopping is used, the address of each RCG that is hopped is stored in the routing table. When an RCG is first powered up, it monitors its 802.11 interface for a period of time to identify other RCGs or Neighborhood Access Point devices, or other Wi-Fi devices within its transmission area. When first deployed, the RCG will not have any entries in its routing tables. This condition can persist for some time, until another RCG or other 802.11 device is deployed within the former RCGs transmission range. In this state, the RCG can be used for wireless networking within the residence, connecting the local computer to the RCGs always on Internet connection as well as to other wireless devices within the home. When an 802.11 frame is received by an RCG that contains the address of an RCG whose address does not exist in the receiving RCG's router table (as is the case when a new RCG is first installed), the receiving RCG polls the transmitting RCG for its router table information. The received router information is reviewed for other RCG's or other 802.11 compatible devices that are not listed in its own router tables. A decision is made to use some, all, or none of the new route information in its router tables. There is no real limitation on the number of RCGs that can be "hopped" in order to build a complete router table or to reach many more RCGs, Neighborhood Access Points or Metro Access Points.

Equipment and Services Priorities:

Just as voice has priority over data transfers within a single RCG, local RCG traffic (both voice and data) has priority over remote transfer requests by other RCGs. If an RCG is currently using all of its available POTS bandwidth for its own purposes, it will deny any remote RCG's request for access to its POTS line. Only when there is available POTS bandwidth available will an RCG allow other RCGs access to its POTS line. It will, however, bounce the traffic to other RCGs within its transmission area if requested by the originating RCG. In this case, available wireless bandwidth of any RCG (that amount of the 11/54 Mbps not currently used for its own traffic) can be used to relay traffic between other RCGs that do have available POTS bandwidth. In the same fashion, excess wireless bandwidth of any RCG can be by other RCGs to access high speed backbones via Neighborhood or Metro Access Points.

RCGs can also access other 802.11 wireless networks (Wi-Fi for example) that happen to be deployed within their service areas. In this case, access agreements between the RCG service provider and the wireless network operator must be put into place. By remaining compatible with the 802.11 standards, the RCGs capabilities will benefit by the growing WI-FI network infrastructure, an the WI-FI network will benefit by the RCG network.

Voice Over POTS and Data Over Wireless:

Normally, all communications from an RCG will be transmitted over the local POTS line, or a multilink bundle made up of many remote RCG POTS lines. By default, all voice calls will be carried over the "local" POTS line—40 to alleviate security/privacy concerns and only "data" will be transmitted via multilink bundles. Generally, since voice "data" is compressed locally by the RCG, the required bandwidth for a voice call is so small that it does not make for a good choice to route it over a multilink connection. However, it is possible to route voice calls entirely over another RCGs POTS line. It is also possible for an RCG to transmit voice data over POTS lines connected to other RCGs via multilink bundles or directly over its 802.11 wireless interface, and since the 802.11 specification does support the Wired Equivalent Privacy (WEP) specification, a secured connection can be made in this fashion.

Remote Upgradability

The RCG is designed with the capability for unassisted remote upgradability. The remote upgradability feature is not the same as the storing of operational parameters during the configuration process. This feature allows the system operator to add new features as they are developed, or to correct bugs remotely and without the users knowledge or involvement. This feature can also be used to install a complete new operating system (OS).

Key to the successful implementation of the Remote upgradability feature is that a completely fail-safe routine be implemented that can recover from any failure during the upgrade process and to re-initiate and monitor the upgrade process until it has successfully completed. This process is carried out by loading a boot loader program that is stored in non-volatile memory. The boot loader program provides the minimum capabilities to start up the RCG and connect into the system operator's diagnostics network to download fixes or a new OS. The boot loader program is technically part of the OS, but it cannot be over written by any upgrade process. It is responsible for detecting failure of the RCG and initiating a connection to the diagnostics network. Once connected with the diagnostics network, the boot loader will provide diagnostics support to help correct the RCG's operation and reconfigure the OS.

What is claimed is:

1. A communications device that is capable of providing broadband communications services, comprising:
   at least one connection for connecting to a communications network;
   at least one wireless interface for connecting wirelessly to at least one remote communications device; and
   a processor that requests the at least one remote communications device to assist in transferring data, sends a request to the at least one remote communications device for availability for participating in a multilink communication, if available, sends control information through the at least one remote communications device for participating in a multilink connection, receives packets from the at least one remote communications device, and aggregates the data from the at least one remote communications device with data transfers from the at least one connection to increase data bandwidth for the communications device.

2. The communications device of claim 1, wherein the at least one remote communications device is at least one of a residential communications gateway, a cable modem, a digital subscriber line, a wireless device, a neighborhood access point device, a Wi-Fi device and a cellular phone.

3. The communications device of claim 1, wherein the communications network is at least one of a public wired network, a private wired network, a public wireless network, and a private wireless network.

* * * * *